United States Patent [19]

Daniels et al.

[11] 4,210,175
[45] Jul. 1, 1980

[54] CHEMICAL INJECTION ASSEMBLY

[76] Inventors: Raymond R. Daniels; Norman W. Scheid, both of 12745 49th St., North, Clearwater, Fla. 33520

[21] Appl. No.: 870,009

[22] Filed: Jan. 16, 1978

Related U.S. Application Data

[63] Continuation-in-part of Ser. No. 748,237, Dec. 6, 1976, abandoned, which is a continuation-in-part of Ser. No. 669,333, Mar. 22, 1976, abandoned.

[51] Int. Cl.² ............................................. E03B 7/07
[52] U.S. Cl. .................................................. 137/564.5
[58] Field of Search .......................... 137/564.5, 101.11

[56] References Cited

U.S. PATENT DOCUMENTS

| | | | |
|---|---|---|---|
| 1,966,658 | 7/1934 | Wade | 137/101.11 |
| 2,323,341 | 7/1943 | McGill | 137/564.5 X |
| 2,618,510 | 11/1952 | Mills | 137/564.5 |
| 3,187,769 | 6/1965 | McDowell et al. | 137/564.5 |
| 3,521,671 | 7/1970 | Handeland | 137/564.5 |
| 4,015,617 | 4/1977 | Connolly | 137/88 |

*Primary Examiner*—William R. Cline
*Attorney, Agent, or Firm*—Duckworth, Hobby, Allen & Pettis

[57] ABSTRACT

A fluid injection assembly of a type designed to inject fluid into a flowing stream of liquid at a predetermined, adjustable rate without the assistance of an outside power source other than the line pressure of the flowing stream itself. The assembly includes a casing having the fluid to be injected disposed therein and at least partially contained by a flexible membrane. Liquid from the flowing stream is partially disposed in fluid communication with the interior of the casing so as to flow in surrounding relation to a portion of the flexible membrane whereby pressure exerted thereon will aid in dispensing of the injection fluid therefrom. An open end of the dispensing line for the injection fluid is disposed within the flowing stream so as to create a negative pressure further aiding in removal of the fluid from within the casing. A liquid flow rate meter is provided so as to give a constant, visual indication of the rate of flow of the liquid into which it is desired to inject a fluid. A similarly constructed fluid injection meter is provided so as to permit visual observation of the rate of fluid injection. A dispensing valve is provided to allow regulation of the rate of injection of fluid into the flowing stream of liquid.

8 Claims, 3 Drawing Figures

CHEMICAL INJECTION ASSEMBLY

This is a continuation-in-part application of our original, co-pending application Ser. No. 748,237, filed Dec. 6, 1976, which was a continuation-in-part application of our prior application Ser. No. 669,333, filed Mar. 22, 1976, both now abandoned.

BACKGROUND OF THE INVENTION

1. Field of the Invention

This invention relates to a fluid injection assembly designed to be used in combination with a flowing stream of liquid whereby metered quantities of a fluid may be injected into the flowing stream. Means are provided for observing both the rate of flow of the flowing stream and the rate of injection of the fluid, and, furthermore, for varying the rate of fluid injection with regard to the flow rate of the flowing stream.

2. Description of the Prior Art

Chemical and fluid injection systems of various types are known and utilized in numerous applications. More specifically, such prior art systems are utilized for the injection of various types of chemicals into bodies of water or other liquids wherein the injection of such chemicals occurs over a predetermined period of time and at a relatively consistent rate. Such applications include, but are obviously not limited to, chemical injection for the purpose of purification of drinking water, treatment of water with fertilizers, pesticides, etc., for agricultural purposes, and the injection of fertilizers and distribution of pesticides for other varied applications of domestic and commercial agricultural purposes.

Another application of such an injection system involves the fluid dispensing of various food products in individual doses such as coin or demand activated vending machines used to dispense various types of liquid foodstuffs.

As stated above, numerous types of prior art or conventional injection assembly structures are known. However, it has frequently been found that the performance and operating characteristics of such prior art devices are less than desirable and in some cases are ineffective or inefficient. Another problem associated with the use of such injection assemblies involves the necessity for use of an outside power source to operate an activating mechanism such as a pump, or the like, for the material being injected. It should be obvious that such auxiliary or supplementary power forms add both to the expense and maintenance service attributable to these prior art devices.

Two exemplar prior art devices are shown in U.S. Pat. No. 2,618,510 to Mills and U.S. Pat. No. 3,187,769, to McDowell, et al. Both of these prior art devices basically depend upon the flow rate of the primary liquid, such as water, to regulate the injection rate of the treatment fluid. However, it is well known that the actual rate of flow of the liquid into which chemicals are to be injected may vary from time to time. Accordingly, as the flow rate of the liquid varies, so will the injection rate of the treatment fluid. This will necessarily result in dispensed concentrations of varying strength.

Accordingly, there is an obvious and recognized need for a fluid injection assembly which is capable of wide and varied applications and which comprises a structure which is relatively maintenance free and relatively unsophisticated, thereby decreasing the cost of initial purchase and the time and money consumed in maintaining the assembly. Such a structure should also be efficient in its operation and sufficiently versatile in its operating characteristics so as to allow its use in a wide variety of applications. The structure of such an assembly should also be capable of allowing the dispensing of a given fluid without the need or use of an auxiliary power source such as a pump mechanism, or the like. In order to provide for relatively constant dispensed solution concentrations, the assembly should also include means for monitoring the flow rate of the liquid into which chemicals are being injected and corresponding means for varying the injection rate dependent upon the liquid's actual flow rate and the desired final concentration.

SUMMARY OF THE INVENTION

This invention relates to a liquid injection assembly of the type primarily designed to dispense a given fluid into a flowing stream of liquid, such as water, at a predetermined rate. More specifically, the injection assembly comprises a casing means having a hollow interior and including a fluid supply means mounted within said interior. The fluid supply means may be in the form of a flexible membrane of predetermined dimension and configuration sufficient to be adapted to the interior configuration of the casing means. The flexible membrane is made from a material capable of collapsing as the fluid stored on its interior is removed therefrom.

A conduit means is connected to the casing means and, more specifically, mounted at least in part on its interior in direct fluid communication therewith. The conduit means is configured so as to define the path of travel of the flowing stream from a point of origination to a predetermined point of delivery. A passage means is integrally formed on the interior of the conduit so as to expose a portion of the liquid within the conduit means directly to the interior of the casing means. The liquid or water comprising the flowing stream is thereby directed in part into the interior of the casing and in surrounding relation to the flexible membrane disposed therein. Accordingly, a certain positive pressure is exerted on the flexible membrane, thereby aiding in the dispensing of fluid from the fluid supply means within the casing.

A dispensing means which includes a valve means is interconnected to the fluid supply means. Upon regulation the valve means allows fluid flow from the fluid supply means into the flowing stream of liquid. An adjustment means is interconnected to the valve means and disposed in hand-manipulative position so as to regulate the position of the valve means and thereby control flow of fluid from the fluid supply means. A dispensing line is disposed, at least in part, within the flowing stream. Accordingly, this disposition of the dispensing line within the flowing stream creates a negative pressure, or venturi action, which produces a siphoning effect on the line. This serves to draw fluid through the line and the valve means from the fluid supply means.

It is, therefore, seen that the provision of a supplementary power source, such as a pump, in order to aid in the removal of fluid from the fluid supply means is unnecessary. Dispensing of the fluid therefrom is aided both by the positive pressure exerted on the flexible membrane as well as the negative pressure resulting in a siphoning effect on the dispensing line.

The valve means and adjustment means comprising the fluid rate meter of the dispensing means is constructed, as will be discussed in greater detail below, so as to provide a constant, visual indication of the rate of fluid flow from the fluid supply means into the stream of liquid diluent. Accordingly, by observing the fluid injection rate meter, a user of the assembly of this invention may easily adjust and regulate the amount of fluid being introduced into a given quantity of liquid diluent in a predetermined time increment.

In order to even more precisely control the concentration strength of the mixture discharged from the assembly of this invention, a liquid, or diluent, flow rate meter is also provided in the conduit means upstream of the dispensing means. While a preferred construction for the flow rate meter means will be presented hereinafter, it should be noted at this point that its construction and operation is so as to provide a visual, instantaneous indication of the volume per time increment of liquid into which fluid will be injected. Accordingly, the operator of the assembly of this invention can easily compare the actual flow rate of liquid with the injection rate of fluid simply by observing the visual indication provided by the two meters. Then, if the liquid's flow rate has varied because of conditions external to the assembly, the operator may make a corresponding adjustment by manipulating the fluid valve means.

It is furthermore contemplated that the present invention may include the provision of a mixing chamber connected to the outlet portion of the conduit means downstream of the point of injection of fluid into the flowing stream. The configuration and dimension of the mixing chamber would be such as to allow proper intermixing of the solution comprising the diluent liquid and the injected fluid. An outlet means is interconnected to the mixing chamber and disposed between the interior of the mixing chamber and a predetermined point of delivery to which the mixed solution is intended to be delivered.

The flexible membrane comprising a portion of the fluid supply means is disposed on the interior of the casing means through proper access structure attached thereto. Fluid inlet means are also provided through a portion of the casing means so as to place fluid within the fluid supply means. The adjustment means, connected to the valve means, is properly regulated to permit the desired or predetermined rate of injection of fluid from the fluid supply means. A preferred embodiment of the fluid injection assembly of the present invention will accurately proportion from one pint per minute to three gallons per minute of liquid with the desired amount of chemical fluid, in a working concentration range as high as one part fluid to fifty parts liquid and as low as one part fluid to 3,500 parts liquid. It is, of course, to be understood that these ranges are given with regard to but one preferred embodiment of the assembly of this invention. The scope of the invention is not to be limited thereto, and it is specifically intended that a particular assembly may be constructed to provide concentration strengths other than those outlined above without departing from the scope of the invention.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
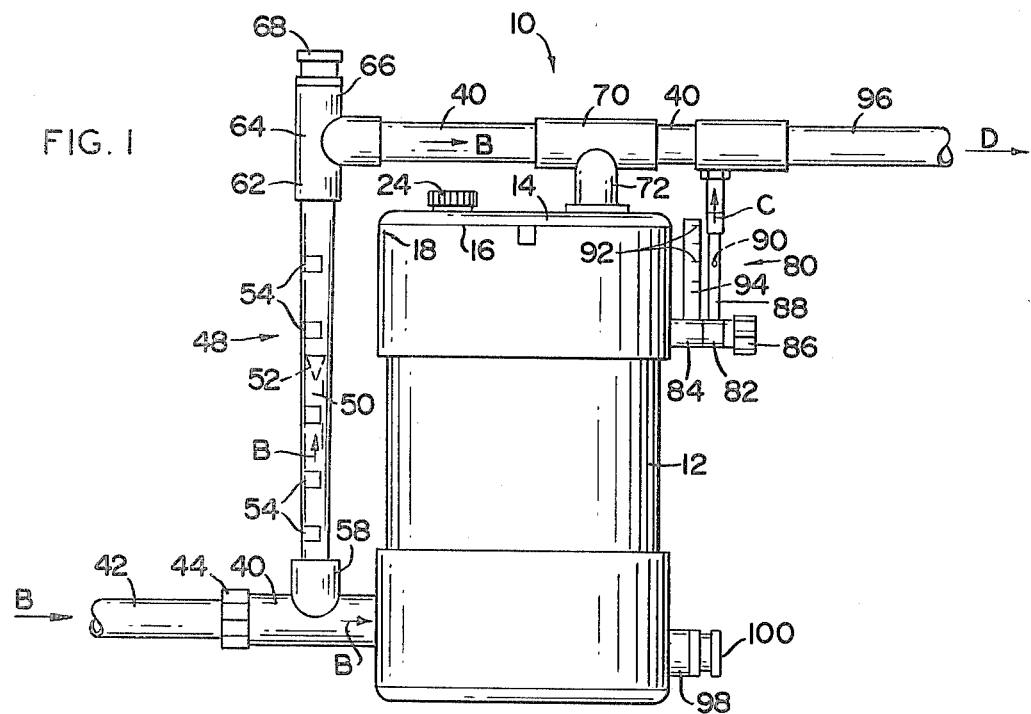
FIG. 1 is an elevational view of a preferred embodiment of the fluid injection assembly.

As shown in the elevational view of FIG. 1, the fluid injection assembly of the present invention is generally indicated as 10 and comprises a casing means 12 shown therein as being substantially cylindrical in configuration. The casing means 12 includes an access element 14 mounted thereon in the form of a cap attached, as at 16 to an open end 18 of casing means 12. As shown in the sectional view of FIG. 2, it may be desirable to utilize an O-ring 20 to provide a substantially fluid-tight seal at junction 16 between access element 14 and open end 18. Alternatively, for example, a threaded connection between access element 14 and open end 18 might be provided, either with or without an O-ring 20. In yet another embodiment it may be desirable to provide access into the interior of casing means 12 through the bottom of assembly 10. As will be described in greater detail below, access element 14 further includes a fluid inlet means comprising a fluid aperture 22 formed through access element 14 and closed by removable cap 24. Fluid aperture 22 is utilized to place the fluid to be injected within the fluid supply means located on the interior of casing means 12.

Figure 2:
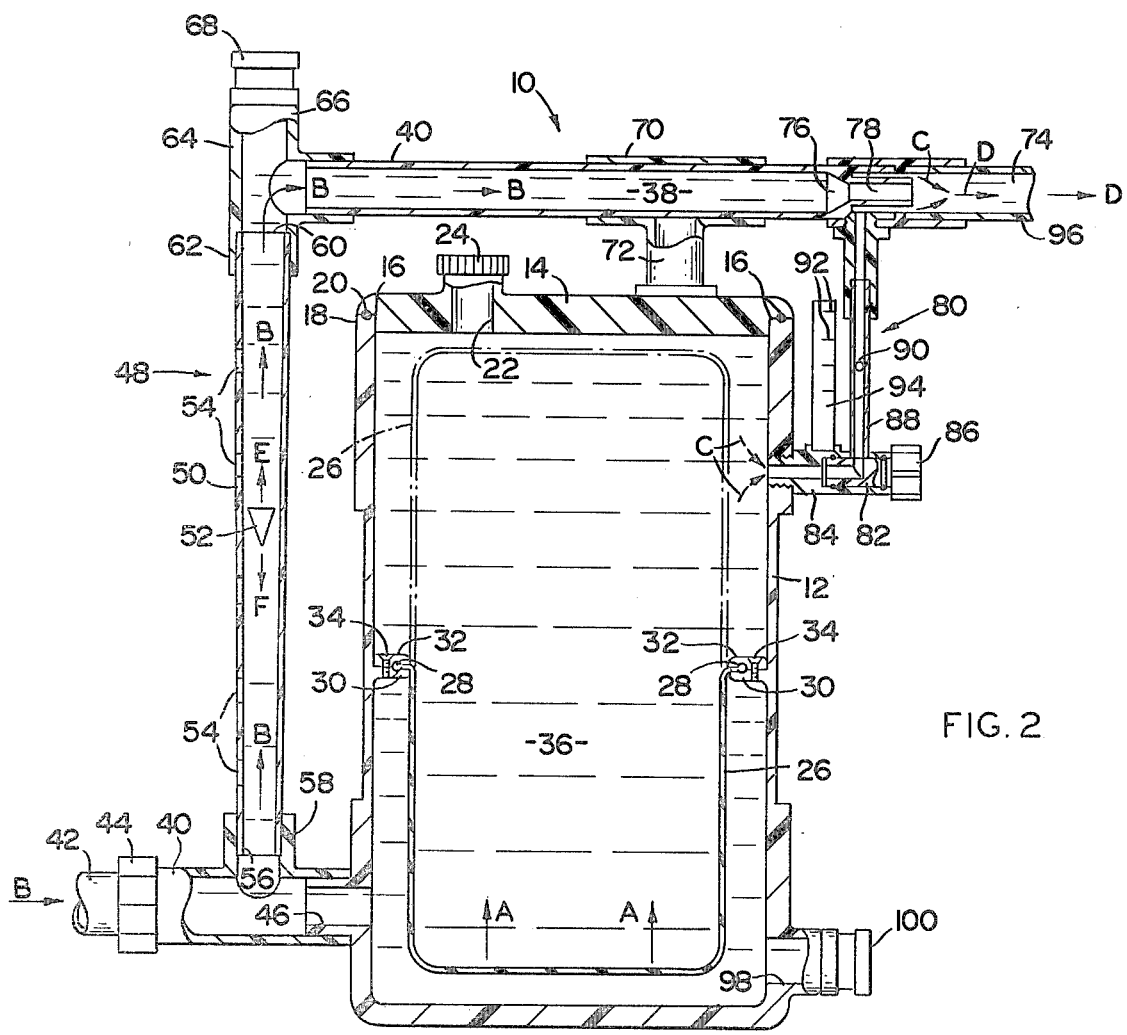
FIG. 2 is an enlarged, sectional view of the preferred embodiment of FIG. 1.

As shown in the sectional view of FIG. 2, the fluid supply means of the invention comprises a flexible membrane 26 movably mounted within casing means 12. Flexible membrane 26 is mounted within casing means 12 by placing a peripheral portion 28 of membrane 26 within mounting ledge 30 formed on the interior of casing means 12. Flexible membrane 26 is retained on mounting ledge 30 in fluid-tight relation thereto as by fixing mounting ring 32 thereover by screw 34. In the solid line view of FIG. 2 the fluid supply means is shown in its substantially "full" position defined by flexible membrane 26 extending toward the bottom of casing means 12 so that substantially all the volume defined by casing means 12 is occupied by injection fluid 36. As will be described in greater detail below, as fluid 36 is injected into diluent liquid 38, membrane 26 will deform toward the top of casing means 12 as indicated by directional arrows A.

Diluent liquid 38 is introduced into assembly 10 through conduit means 40 which is attached to a liquid source 42 as by coupling 44. Liquid 38 enters assembly 10 and passes therethrough as indicated by directional arrows B. Injection fluid 36 follows the path indicated by directional arrows C. Finally, the resulting solution comprising the mixture of fluid 36 and liquid 38 exits assembly 10 as indicated by directional arrows D.

As best seen in the sectional view of FIG. 2, conduit means 40 comprises a liquid inlet 46 disposed in liquid-communicating relation to the interior of casing means 12. It is the pressure of liquid 38 entering inlet 46 which causes flexible membrane 26 to deform as indicated by directional arrows A, thereby transporting fluid 36 as indicated by directional arrows C.

Conduit means 40 further comprises liquid flow rate metering means, generally indicated as 48, operatively disposed along a portion of conduit means 40 so as to measure the quantity of liquid 38 comprising the flowing stream into which fluid 36 will be injected. Liquid flow rate metering means 48 comprises a substantially transparent, tapered conduit section 50 and a flow rate indicator 52 movably disposed within conduit section 50. Visible flow rate graduations 54 are placed in regular, spaced apart disposition on conduit section 50 so that the position of flow rate indicator 52 can be compared with graduations 54 in order to determine the rate of flow of the flowing stream. Dependent upon that rate of flow, flow rate indicator 52 will rise or fall within conduit section 50 as indicated by directional arrows E and F, respectively. As best seen in the view of FIG. 2, the lower relatively smaller end 56 of conduit section 50 is attached to conduit means 40 by its insertion within T-connector 58 integrally formed on conduit 40. The upper, relatively larger end 60 of conduit section 50 is disposed in fluid communicating relation with a corresponding arm 62 of second T-connector 64.

Conduit means 40 then extends from second T-connector 64 so as to direct the flowing stream of liquid 38 in a direction which is substantially perpendicular to that defined by liquid flow rate metering means 48. At this point it may be noted that arm 66 of second T-connector 64 is provided with a removable closure means 68 so as to facilitate draining, flushing and cleaning of conduit means 40.

Conduit means 40 then extends across access element 14 of casing means 12 in spaced apart, substantially parallel relation thereto. A conduit support sleeve 70 is disposed in partially surrounding relation to conduit means 40 and includes a support leg disposed in interconnecting relation between sleeve 70 and a portion of access element 14. Support sleeve 70 and leg 72 are provided to reinforce and enhance the structural integrity of assembly 10, and it is to be understood that a structural configuration other than that illustrated in this preferred embodiment may be utilized within the scope of this invention.

Liquid 38 defining the flowing stream is ultimately delivered from conduit 40 into chamber means 74 disposed in fluid communicating relation to conduit means 40. As shown in FIG. 2, the delivery end of conduit means 40 includes a tapered portion 76 and a delivery portion 78 of relatively lesser diameter than conduit means 40. This construction will necessarily increase the velocity of liquid 38 as it is delivered from conduit means 40, resulting in a pressure differential or venturi effect tending to draw or pull fluid 36 from the fluid supply means.

A dispensing means, generally indicated as 80, is mounted in fluid-communicating relation between the fluid supply means and liquid 38 flowing within conduit means 40 downstream of the liquid flow rate metering means 48. Dispensing means 80 comprises an adjustable valve means 82 mounted in flow regulating relation to fluid 36 exiting the fluid supply means as indicated by directional arrows C. As best seen in the sectional view of FIG. 2, adjustable valve means 82 is operatively disposed within a dispensing conduit 84 communicating through a wall of casing means 12 with fluid 36. An adjustment means comprising a hand-manipulative knob 86 is operatively attached to valve means 82 so as to permit operator control of fluid flow rate therethrough.

A fluid injection metering means comprising a transparent, tapered tube portion 88 and a fluid injection indicator 90 movably disposed therein, is operatively disposed in fluid-communicating relation between valve means 82 and delivery portion 78 of conduit means 40. As with liquid flow rate metering means 48, the relative position of fluid injection indicator 90 within tube portion 88 is indicative of the rate of injection of fluid 36 into liquid 38. In order to provide a visual means for determining that rate of fluid flow, rate indices are provided adjacent tube portion 88. In the illustrated embodiment, the rate indices comprise markings 92 placed upon fluid rate standard 94 which is disposed in adjacent, substantially parallel relation to tube portion 88. The operator of assembly 10, by comparing the position of fluid injection indicator 90 with markings 92, can readily observe the quantity per time increment of fluid 36 which is being injected into the flowing stream of liquid 38. As previously stated, because of the construction of conduit means 40 to include a delivery portion 78 of reduced internal diameter, a pressure differential will be created thereby enhancing the injection of fluid 36 into the flowing stream of liquid 38.

As previously stated, the volume wherein fluid 36 is injected into liquid 38 is defined as a chamber means 74 dimensioned and configured to provide mixing of fluid 36 and liquid 38. In the illustrated embodiment, chamber means 74 comprises an outlet conduit 96. The desired final solution is provided for end use through outlet conduit 96 as indicated by directional arrows D. It is to be understood that it may be desirable to construct a chamber means 74 comprising a holding and/or mixing tank.

Finally, it should be noted that casing means 12 is provided with a drain aperture 98 including a removable drain cap 100, whereby that portion of the interior of casing means 12 below flexible membrane 26 may be emptied, flushed and cleaned.

Having thus set forth a preferred construction for the fluid injection assembly of the present invention, attention is next invited to a brief presentation concerning the assembly's manner of operation.

First, coupling 44 is connected to liquid source 42 and outlet conduit 96 is connected to a suitable end use facility such as, for example, watering troughs. Initially, liquid source 42 is secured so as to prevent any flow of diluent liquid 38 therethrough. Next, the operator adjusts knob 86 so as to close valve means 82. Drain cap 100 is removed and the interior of casing means 12 comprising the fluid supply means is filled by introducing injection fluid through opened fluid aperture 22. This filling will necessarily deform flexible membrane 26 into a position substantially as shown in the view of FIG. 2. When the fluid supply means is filled, cap 24 is closed as is drain cap 100.

The valve (not shown) controlling liquid source 42 is next opened and the actual flow rate of the flowing stream of liquid 38 is observed utilizing liquid flow rate metering means 48. For example, dependent upon the particular size of assembly 10, the position of flow rate indicator 52 with regard to flow rate graduations 54 might show an actual rate of flow of from one to five gallons per minute. The position of flow rate indicator 52 in the view of FIG. 1 might, for example, represent a flow rate of 2.5 gallons per minute.

Having thus determined the actual flow rate for liquid 38, the operator next adjusts valve means 82, using knob 86, so as to obtain the desired, predetermined injection ratio of fluid 36 to liquid 38. This is, of course, visually indicated by comparing the position of fluid injection indicator 90 with markings 92. For example, the dispensing means 80 might be said to provide as much as one part fluid 36 to fifty parts liquid 38, or as little as one part fluid 36 to 3,500 parts liquid 38. Inasmuch as assembly 10 includes both a liquid flow rate metering means 48 and a dispensing means 80, should the actual flow rate of liquid 38 vary so as to cause a corresponding fluctuation in the ratio of fluid injection, this change in flow rate would be immediately observable by the operator by a change in position of flow rate indicator 52. The operator can then make a corresponding adjustment in dispensing means 80 so as to maintain the desired final solution concentration.

Figure 3:
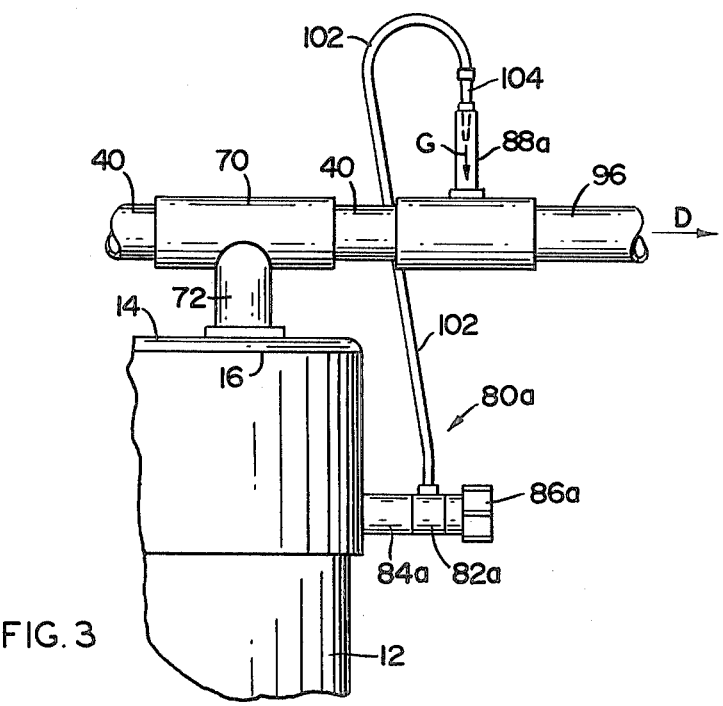
FIG. 3 is an enlarged, fragmentary view of a second embodiment of the dispensing means.

Attention is now invited to the view of FIG. 3, wherein a modification of the dispensing means, herein generally indicated as 80a, is shown. With the exception of the structural elements comprising dispensing means 80a the remainder of assembly 10 is as previously described. Accordingly, those common structural elements have been identified by the same reference numerals. Structural elements of this dispensing means 80a corresponding to those of the first embodiment have been so designated by the addition of the letter "a" thereto. New structural elements will be defined below and have been assigned new reference numerals. However, before giving a detailed description for dispensing means 80a it should be noted that this second embdiment is primarily intended for use wherein relatively small ratios of fluid 36 to liquid 38 are desired. As will be set forth below, then, dispensing means 80a might be generally characterized as a drip rate fluid injection metering means.

Dispensing means 80a comprises an adjustable micro valve means 82a mounted in flow regulating relation to fluid 36 exiting the fluid supply means. Adjustable micro valve means 82a is operatively disposed within dispensing conduit 84a communicating through a wall of casing means 12 with fluid 36. An adjustment means comprising a hand-manipulative knob 86a is operatively attached to valve means 82a so as to permit operator control of fluid flow rate therethrough.

The fluid injection metering means of this embodiment comprises a transparent, tube portion 88a operatively disposed in fluid-communicating relation between valve means 82a and delivery portion 78 (not shown) of conduit means 40 by fluid conduit 102 and fluid drop tip 104. Fluid drop tip 104 is mounted in fluid-communicating and fluid-tight relation to tube 88a by conventional means. Of course, a similar attachment is made between fluid drop tip 104 and fluid conduit 102. It should also be noted that fluid conduit 102 is preferrably formed from a flexible conduit material. In this embodiment of FIG. 3, knob 86a may be manipulated by the operator so as to adjust micro valve means 82a to dispense a predetermined number of drops per time increment of fluid 36 from fluid drop tip 104 into liquid 38. This rate of fluid injection may, of course, be readily observed and monitored by virtue of the fact that tube 88a is formed from a substantially transparent material. Drops of fluid 36 fall in the direction indicated by directional arrow G, and are intimately mixed into the flowing stream of liquid 38 within chamber means 74 (not shown) defined within outlet conduit means 96.

Accordingly, through the use of the embodiment shown in FIG. 3 very small quantities of the treatment fluid may be accurately dispensed into a flowing stream of liquid. Inasmuch as the above description has been given with regard to the addition of fluids at a drop rate, it is to be understood that the word "drop" is meant to express the minimum standard for fluid measurement. In more precise technical terminology a "drop" is known as a "minim." There are 480 minims per fluid U.S. ounce.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fluid injection assembly of the type primarily designed to add predetermined amounts of fluid comprising a liquid to a flowing stream of liquid, said fluid injection assembly comprising: casing means; conduit means configured to define the path of travel of the liquid, said conduit means comprising a liquid inlet disposed in liquid-communicating relation to the interior of said casing means and further comprising liquid flow rate metering means operatively disposed along said conduit means, said liquid flow rate metering means comprising a transparent, tapered conduit section and a flow rate indicator movably disposed therein whereby displacement of said flow rate indicator within said conduit section is indicative of the quantity of liquid defining said flow stream; fluid supply means mounted on the interior of said casing means and at least partially surrounded by the liquid within said interior of said casing means; dispensing means mounted in fluid-communicating relation between said fluid supply means and the liquid flowing within said conduit means downstream of said liquid flow rate metering means, said dispensing means comprising adjustable valve means mounted in flow-regulating relation to fluid exiting said fluid supply means and fluid injection metering means comprising a transparent, tapered tube portion and a fluid injection indicator movably disposed therein operatively disposed in fluid-communicating relation between said adjustable valve means and said conduit means downstream of said liquid flow rate metering means, whereby displacement of said fluid injection indicator within said tube portion is indicative of the rate of fluid injection into said flowing stream; and chamber means connected to the outlet of said conduit means in receiving relation to said flowing stream and to the fluid from said fluid supply means, said chamber means being dimensioned and configured to provide mixing of fluid from said fluid supply means and liquid of said flowing stream.

2. A fluid injection assembly as in claim 1 wherein said fluid supply means comprises a flexible membrane movably mounted within said casing means in segregating relation between said liquid inlet and said dispensing means, said flexible membrane being dimensioned and configured to substantially correspond to at least a portion of the interior of said casing means, whereby said flexible membrane is movably transferred on the interior of said casing means as fluid is dispensed therefrom.

3. A fluid injection assembly as in claim 1 wherein said adjustable valve means comprises adjustment means operatively connected to said valve means and extending therefrom in hand-manipulative position relative to said fluid injection assembly.

4. A fluid injection assembly as in claim 1 wherein said conduit section includes visible flow rate graduations placed thereon, whereby the rate of said flowing stream may be observed by comparing the position of said flow rate indicator to said graduations.

5. A fluid injection assembly as in claim 1 wherein said tube portion includes visible injection rate indices placed thereadjacent, whereby the rate of fluid injection may be observed by comparing the position of said fluid injection indicator to said indices.

6. A fluid injection assembly as in claim 1 wherein said fluid injection metering means comprises a transparent tube portion, one end of said tube portion being in fluid-communicating relation to said conduit means and the other end of said tube portion being in fluid-communicating relation to said fluid passing through said adjustable valve means.

7. A fluid injection assembly as in claim 6 wherein said fluid injection metering means further comprises a fluid conduit, one end of said fluid conduit being in fluid-communicating relation to said adjustable valve means, and a fluid drop tip disposed in interconnecting, fluid-communicating relation between the other end of said fluid conduit and said other end of said tube portion, whereby the number of drops of said fluid being injected into said flowing stream per time increment may be observed.

8. A fluid injection assembly as in claim 1 further comprising fluid inlet means formed in said casing means, whereby a quantity of fluid may be placed within said fluid supply means.

* * * * *